United States Patent [19]

Menges, Sr. et al.

[11] Patent Number: 4,846,076
[45] Date of Patent: Jul. 11, 1989

[54] BUCKET BOARD AND SEAT APPARATUS

[75] Inventors: William H. Menges, Sr.; William H. Menges, Jr., both of Pt. Pleasant; Douglas Finlay, Brick Town, all of N.J.

[73] Assignee: Fast Feat Bucket Board Co., Brielle, N.J.

[21] Appl. No.: 211,568

[22] Filed: Jun. 27, 1988

[51] Int. Cl.⁴ .............................................. A47B 23/00
[52] U.S. Cl. .................................. 108/42; 298/213.2; 297/193
[58] Field of Search ........................ 108/42, 35.3, 46; 297/193; 182/33, 222; 248/213.2

[56] References Cited

U.S. PATENT DOCUMENTS

| | | | |
|---|---|---|---|
| 935,025 | 9/1909 | Hoban | 248/213.2 X |
| 1,292,980 | 1/1919 | Fry | 248/213.2 |
| 2,013,823 | 9/1935 | Chancer | 248/213.2 X |
| 2,632,683 | 3/1953 | Sterling | 312/231 |
| 4,033,461 | 7/1977 | Nevai | 108/24 X |
| 4,487,135 | 12/1984 | Van Ryn | 297/193 X |
| 4,632,347 | 12/1986 | Jurgich | 248/213.2 |
| 4,760,802 | 8/1988 | Leong | 108/150 X |

*Primary Examiner*—Peter A. Aschenbrenner
*Attorney, Agent, or Firm*—Richard C. Woodbridge

[57] ABSTRACT

A bucket board includes a semi-circular groove therein for engaging only a portion of the rim of a conventional bait bucket. The groove is sufficiently deep so that if the board were to tilt slightly, the outer wall of the groove will bite into the outer wall of the bucket thereby keeping it from tipping over. A built-up rim surrounds most of the outer edge of the top surface and serves to keep debris from falling off the board when the invention is used as a fish cleaning board. An opening in the built-up rim permits scraps to be scraped into the bait bucket when the fish cleaning process is completed. Alternatively, the board can be used as a comfortable seat for a fisherman or passenger to sit on. The inside of the bucket is accessible while the bucket board is mounted on the bucket and can be rotated while the bait bucket remains stationary. A slot that extends all the way through the board safely accommodates the blade of a knife. An integral molded ruler is incorporated into the surface of the bucket board. The entire device is made from blow-molded, high molecular weight HD polyethylene which preferably incorporates integrally molded posts for additional strength. Nylon, polypropylene, ABS and polyester could also be used for constructing the device.

18 Claims, 2 Drawing Sheets

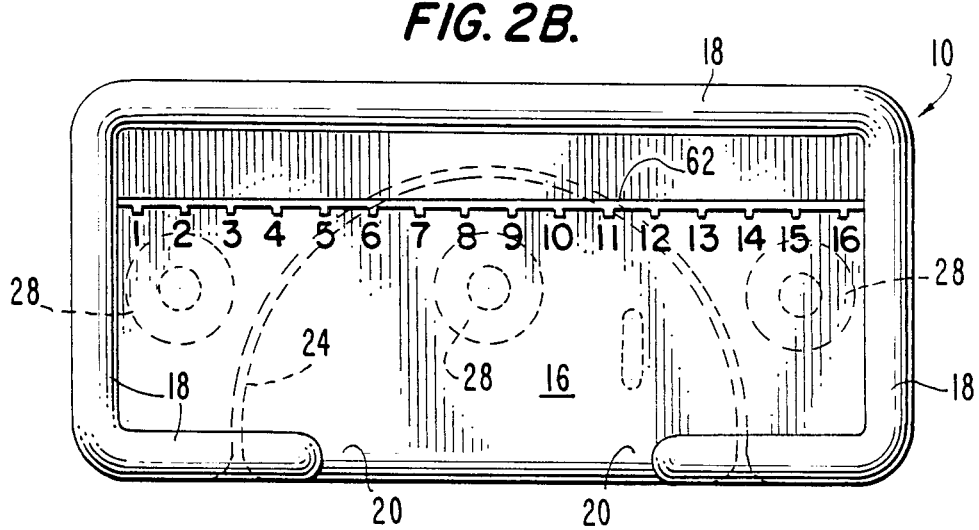
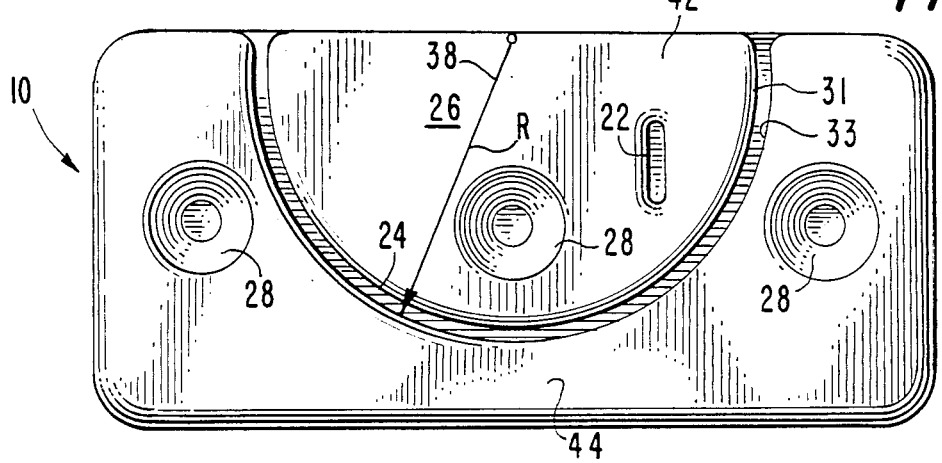
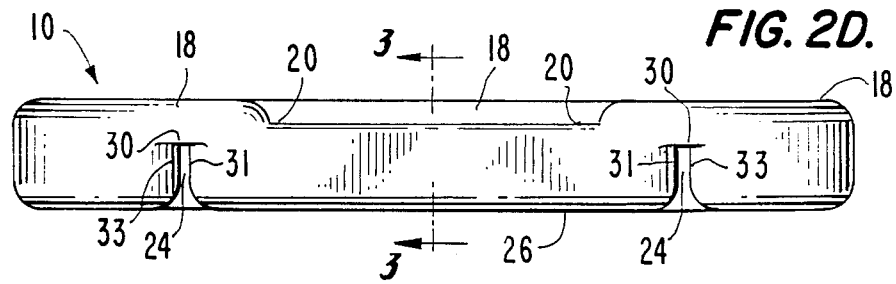
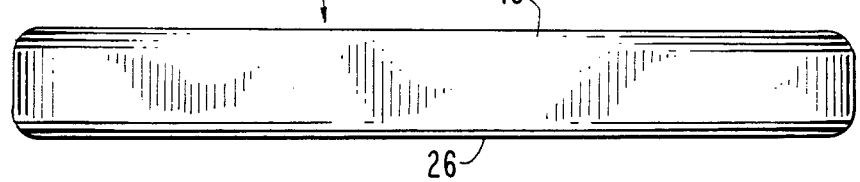
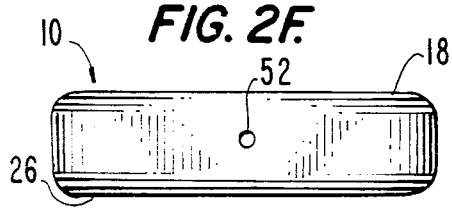
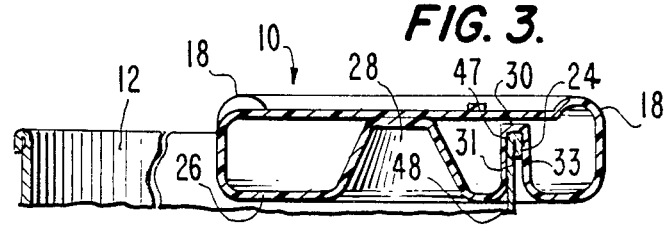

BUCKET BOARD AND SEAT APPARATUS

BACKGROUND OF THE INVENTION

1. Field of the Invention

The invention relates to a combined seat and cutting board apparatus which is mountable on a standard plastic or metal bucket.

2. Description of Related Art

The prior art reveals a few attempts to combine a seat with a bucket for the purpose of providing a fisherman with a chair. Unfortunately, the structure of most prior art devices is relatively complicated and frequently limited to specific applications. For example, U.S. Pat. No. 4,295,680 describes a portable bucket seat that fits on the open end of a standard bucket of the type commonly used by fishermen. The seat appears to cover the entire opening of the surface of the bucket and includes a reel portion on the bottom thereof which accepts a coiled up rope. The purpose of that invention is to combine the seat with a safety buoy so that the seat can be thrown to an individual who may have fallen overboard while the person in the boat retains the free end in the boat.

U.S. Pat. No. 4,436,340 entitled, "Fishing Seat, Rod Holder and Pail" discloses another device which fits over a common fisherman's bucket. The device is adapted to hold a fishing rod, if desired.

U.S. Pat. No. 4,379,587 discloses a Seat Structure in which the seat sits over a conventional fishing bucket. In that case, the seat looks very much like a regular stool and the footprint of the seat virtually covers the entire opening of the bucket.

The following patents also disclose bucket seats, but appear to be of a lesser relevance: U.S. Pat. Nos. 2,919,169; 4,106,811; and 4,228,894.

While the forgoing indicate that there is some limited prior art directed toward the concept of placing a seat on a common fisherman's pail, there appears to be several major shortcomings. First, the seats tend to effectively eclipse the entire opening of the bucket thereby making it hard to use the bucket for catching scraps or for retrieving bait while still seated. Second, the structures are relatively complex and therefore difficult to keep clean. Third, many of them include raised portions that increase their tendency to tip off the bucket if a fisherman places his weight on the seat in an in an inappropriate fashion. And, fourth, because the structures of the prior art are relatively involved, they are believed to be moderately expensive to manufacture. The present invention is able to overcome all of the shortcomings of the prior art in a very novel fashion.

SUMMARY OF THE INVENTION

Briefly described, the invention comprises a combined seat and bucket board which is mountable on a conventional bait bucket. The device is preferably blow-molded from high molecular weight HD polyethylene and includes internal posts for additional structural strength. The top surface includes a built-up rim which circumscribes all except a few inches of the edge of the top surface. A gap in the rim permits debris, such as fish scales and cut bait to be scraped into the bucket upon which the board sits. A deep, semi-circular groove on the bottom surface engages the rim of the bait bucket. The groove is sufficiently deep so that if the board were to tilt, the outer wall of the groove will engage the outer wall of the bucket thereby tending to minimize the tendency to tip off. The groove has a radius of approximately 5⅜ inches and has an arc length of approximately 180 degrees. A slot extending from the top surface, through the board to the bottom surface can accommodate the blade of a knife.

The invention serves two major functions. First, it is very useful as a seat since it sits securely on the top of the bait bucket while permitting access to the bucket for bait retrieval. Second, it can be used as a cutting board or a small table. Scraps from the cutting process can be scraped directly into the open portion of the bucket through the gap in the built-up rim on the top surface.

These and other features of the invention will be more fully understood by reference to the following drawings.

BRIEF DESCRIPTION OF THE DRAWINGS

FIG. 3 is a cross-sectional view of the embodiment of FIG. 2A illustrating the manner in which the bottom groove engages the rim of the bait bucket.

DETAILED DESCRIPTION OF THE PREFERRED EMBODIMENT

During the course of this description, like numbers will be used to identify like elements according to the different views which illustrate the invention.

Figure 1A:
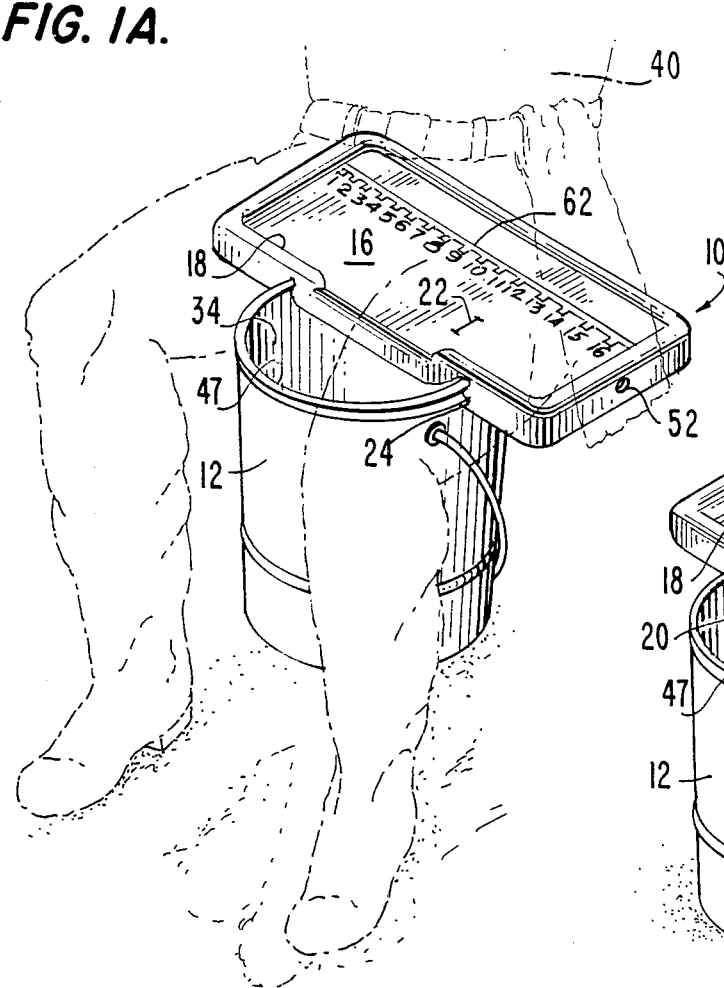
FIG. 1A illustrates the preferred embodiment of the invention mounted on a bait bucket and used as a seat.

FIG. 1A illustrates the combined seat and bucket board invention 10 according to the preferred embodiment thereof in an operating position mounted on a conventional bait bucket 12. A fisherman 40 is shown in a seated position on the seat 10. The bait bucket 12 is of the type commonly used by fishermen. Such buckets typically have a height of 14½", a diameter of 11¼" on the open rim 47 and can be purchased from bait or tackle shops. It will be noted that the invention 10 does not eclipse the entire top opening of bucket 12, but instead leaves a portion 34 of the opening available for receiving cut bait and available to retrieve bait. For example, the fisherman 40 could push bait pieces or other wastes in through opening 34 and retrieve bait through opening 34. Alternatively, it may be possible to use the opening 34 for the fisherman 40 to relieve himself or herself while the boat is underway. This helps to assure that the fisherman 40 will be in compliance with federal and local sewage discharge laws and regulations.

Figure 1B:
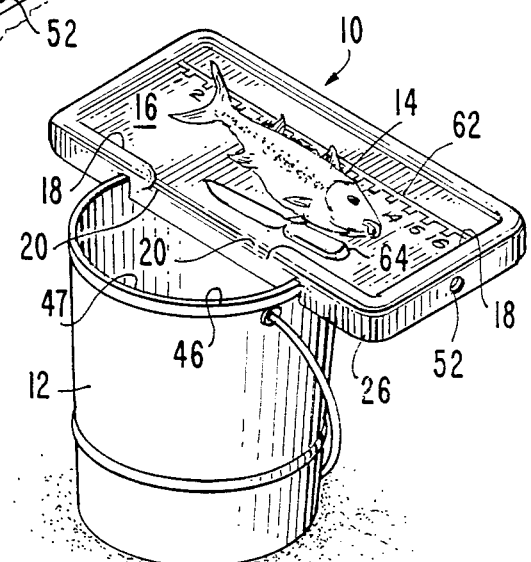
FIG. 1B illustrates the preferred embodiment of the invention also mounted on a bait bucket and employed as a cutting board.
Figure 2A:
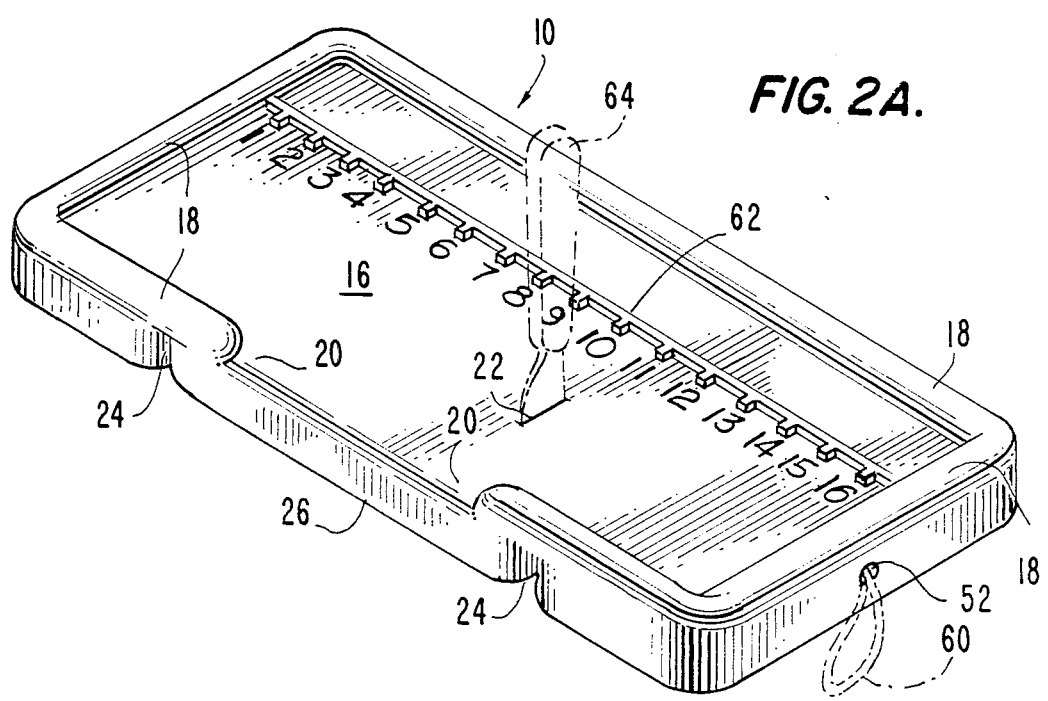
FIG. 2 is a front perspective view of the preferred embodiment of the invention.
FIG. 2B is a top plan view of the embodiment illustrated in FIG. 2A.
FIG. 2C is a bottom plan view of the embodiment illustrated in FIG. 2A.
FIG. 2D is a front elevational view of the embodiment illustrated in FIG. 2A.
FIG. 2E is a rear elevational view of the embodiment illustrated in FIG. 2A.
FIG. 2F is a right side elevational view of the embodiment illustrated in FIG. 2A.

FIG. 1B illustrates the invention 10 used in its other primary mode as a cutting board. A Fish 14 is shown being scale on the top surface 16 of the board. A built-up plastic rim 18 circumscribes most of the edge of the top surface 16. Opening 20 in rim 18 permits the fisherman 40 to scrape scales and other waste into the open portion 34 of the top end of bucket opening 36. FIG. 2A illustrates a knife blade slot 22 of the invention 10 that extends all the way from top surface 16, through the invention 10 and out of the bottom surface 26. The purpose of the knife blade engaging slot 22 is to secure a knife 64 in a safe manner while the boat is underway. The handling of a knife in rough water can be dangerous and the inclusion of the knife blade slot 22 helps to minimize that exposure. Knife slot 22 is molded directly into the invention 10 during the molding process.

As shown in FIG. 2C a bucket rim engaging groove 24 is located on the bottom surface 26 of the invention 10. Groove 24 has a Radius 38 shown in FIG. 2C of approximately $11\frac{1}{4}''$ which is substantially equal to the radius of the rim 47 of the open end of bucket 12. Groove Radius 38 is preferably $5\frac{5}{8}''$, but may fall within the ranges of $5\frac{1}{2}''$ to $6\frac{1}{2}''$ to accommodate other buckets. Groove 24 preferably has an arc length of 180°, but may range from 60° degrees to 300° degrees. The larger the arc length of groove 24, the smaller the non-eclipsed opening 34 becomes; and, conversely, the smaller the arc length of groove 24, the larger the non-eclipsed opening 34 becomes.

As seen in FIG. 3, groove 24 has a bottom surface 30 and a pair of opposing walls comprising an inner wall 31 and an outer wall 33. Inner wall 31 defines one edge of the portion 42 of the bottom surface 26 that normally sits above the eclipsed portion of the bucket 12 when the invention 10 is properly positioned on bucket 12. Similarly, outer wall 33 defines the inner edge of the outer surface 44 of the bottom surface 26 which normally is located outside of the bucket 12 when the invention 10 is properly positioned on the bucket 12. According to the preferred embodiment of the invention, the groove 24 has a depth of approximately $1\frac{1}{2}''$ as measured from the bottom surface 26 of the invention 10 to the bottom of the groove 30. The preferable range of the depths of the groove 24 is in the neighborhood of 1 to 2 inches. The preferable distance between inner wall 31 and outer wall 33 is $\frac{3}{8}$ inches, but may fall in the range of $\frac{1}{4}$ to $\frac{1}{2}$ inches. Also, according to the preferred embodiment of the invention 10, the length of the invention 10 is preferably $19\frac{1}{2}''$ within a preferred range of 19 to 20 inches, and has a preferable width of 6 inches within a preferable range of $5\frac{1}{2}$ to $6\frac{1}{2}$ inches, and has a preferable depth of $2\frac{1}{8}$ inches within a range of 2 to 3 inches. The ratio of the inner surface area 42 to the outer surface area 44 is preferably 1.3:1, but may fall within the range of 1:1 to 1:4.

The dimensions of the groove 24 and the rim 47 of the opening 34 of the bucket 12 is relatively important. Because the groove does not engage the entire 360 degrees of the rim, it is useful for it to provide additional support in other ways. This is largely accomplished by making the depth of the groove 24 fairly deep and the distance between the inner wall 31 and the outer wall 33 relatively small, so that if the invention 10 tilts slightly away from opening 34, the outer wall 33 will touch and engage the outer wall 48 of the bucket 12. In this way, the characteristics of the groove 24 compensates for the fact that it does not engage the entire 360 degrees of the rim 47 of bucket 12. In addition, it is generally desirable that the invention 10 at least partially cover the center of gravity, i.e. the center of opening 34 of bucket 12. It is also desirable, though not necessary, for the fisherman 40 to sit with his or her legs in the direction of the non-eclipsed partial opening 34 for improved stability.

The invention 10 is preferably formed from a hard, blow-molded plastic such as high molecular weight HD polyethylene. A commercially available product is known as Paxon TM and is sold by the Allied Signal Corp. However, other plastics are also appropriate under other circumstances. FIG. 3 illustrates a hole 52 incorporated into one end of the invention 10 to facilitate the draining of water and other fluids from the interior of the invention 10. A lanyard 60 may be inserted in drainage hole 52 to serve as a method of hanging up the board for storage. Three strengthening posts 28 are integrally molded into the board 10 and extend from the bottom surface 26 through the invention 10 and unite with the bottom of the top surface 16. The invention preferably has three such posts, but the number of posts could range from at least two to perhaps as many as four or five. Integral posts 28 provide significant additional stiffening to the invention 10 so that it can support the weight of even heavy fisherman 40.

In summary, it will be seen that the invention is relatively non-complicated, serves the function of a cutting board and seat very well, is relatively safe, and easy to clean. Insofar as understood, none of the prior art taken individually or in combination provides the foregoing advantages.

While the invention has been described with reference to the preferred embodiment thereof, it will be appreciated by those of ordinary skill in the art and modifications can be made to the structure and form of the invention without departing from the spirit or scope thereof.

We claim:

1. A cutting board and seat apparatus for mounting on the open end of a bucket, said apparatus comprising:
  a board having a top and a bottom surface; and,
  a groove located in the bottom surface of said board for engaging the rim of the open end of said bucket, said groove dividing the bottom surface of said board into a first and a second section, said first section comprising that portion of the bottom surface which at least partially covers the open end of said bucket when said apparatus is mounted on the rim of said bucket and said second section comprising the remaining portion which normally extends outside of said bucket when said apparatus is mounted on said bucket, such that the ratio of the area of said first section to the area of said second section is in the range of 1:1 to 1:4, said groove comprising a portion of an arc having a radius in the range of $5\frac{1}{2}$ to $6\frac{1}{2}$ inches, a depth in the range of $\frac{1}{2}$ to 2 inches, and an arc length in the range of at least 180° to 300°,
  wherein said apparatus at least partially covers the center of gravity of the open end of said bucket.

2. The apparatus of claim 1 wherein said top surface of said board includes a built-up rim around the edge of said top surface.

3. The apparatus of claim 2 wherein said built-up rim includes an opening therein which is normally locatable over the open end of the said bucket when said apparatus is properly mounted on the rim of said bucket.

4. The apparatus of claim 3 further comprising:
  a knife engaging slot means extending from said top surface, through said apparatus to said bottom surface, wherein said knife engaging slot means can accept the blade of a conventional fish cutting knife.

5. The apparatus of claim 4 further comprising:
a ruler means integrally molded into said top surface for measuring fish.

6. The apparatus of claim 5 wherein said groove includes a first wall, and an opposing second wall and a bottom portion at the intersection of said first and second walls for contacting the rim of said bucket,
wherein the distance between said first and second walls is in the range of ¼ - 1 inch.

7. The apparatus of claim 6 wherein said first wall defines the outer boundary of said first section of said bottom surface and said second wall defines the inner boundary of the second section of said bottom surface, and
wherein the distance between said first wall and said second wall is such that said second wall tends to engage the outer wall of said bucket if said apparatus tips away from said bucket under the influence of the weight of a seated individual.

8. The apparatus of claim 7 wherein said apparatus is formed from a high strength, blow-molded plastic.

9. The apparatus of claim 7 wherein said apparatus is formed from a high strength rotationally molded plastic.

10. The apparatus of claim 7 wherein said apparatus is formed from a two piece joined injection molded plastic.

11. The apparatus of claim 8 further comprising:
at least two post means, integrally molded into said apparatus and extending from said bottom to said top surface for adding additional strength to said apparatus.

12. The apparatus of claim 1 wherein said groove has a radius of 5⅜", a depth of 1¼" as measured from the bottom surface of said apparatus to said bottom portion of said groove, and a distance of ⅜" between said first and second walls thereof.

13. The apparatus of claim 12 wherein said apparatus is made from high molecular weight HD polyethylene.

14. The apparatus of claim 12 wherein said apparatus is made from nylon.

15. The apparatus of claim 12 wherein said apparatus is made from polypropylene.

16. The apparatus of claim 12 wherein said apparatus is made from ABS.

17. The apparatus of claim 12 wherein said apparatus s made from polyester.

18. The apparatus of claim 13 wherein said apparatus includes an aperture in the edge thereof communicating with the interior of said apparatus and said apparatus further comprises:
a lanyard attachable to said apparatus through said aperture.

* * * * *